United States Patent [19]

Jager

[11] 4,299,764
[45] Nov. 10, 1981

[54] AZO REACTIVE DYESTUFFS

[75] Inventor: Horst Jager, Leverkusen, Fed. Rep. of Germany

[73] Assignee: Bayer Aktiengesellschaft, Leverkusen, Fed. Rep. of Germany

[21] Appl. No.: 54,726

[22] Filed: Jul. 5, 1979

[30] Foreign Application Priority Data

Jul. 20, 1978 [DE] Fed. Rep. of Germany ....... 2831912

[51] Int. Cl.$^3$ ............................................. C09B 29/22
[52] U.S. Cl. .................................... 260/153; 260/154; 260/156; 260/157
[58] Field of Search ................ 260/154, 153, 156, 157

[56] References Cited

U.S. PATENT DOCUMENTS 4,065,446 12/1977 Bien et al. ....................... 260/154 X
4,091,021  5/1978 Andrew et al. ................. 260/154 X
4,124,579 11/1978 Parton ............................. 260/154 X
4,126,609 11/1978 Jager ............................... 260/154 X

FOREIGN PATENT DOCUMENTS 2232541 1/1974 Fed. Rep. of Germany .
2407244 5/1979 France .

Primary Examiner—Paul F. Shaver

Attorney, Agent, or Firm—Sprung, Felfe, Horn, Lynch & Kramer

[57] ABSTRACT

Dyestuffs of the formula

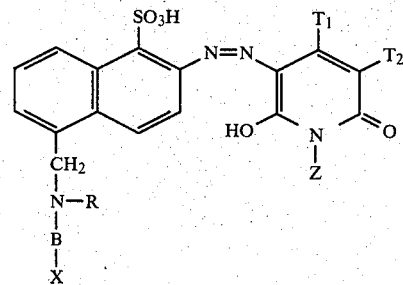

wherein
R, $T_1$, $R_1$, $R_2$, $NR_1R_2$, $T_2$, Z, B and . . . have the meaning given in the description, and their use for dyeing and printing materials containing hydroxyl groups or amide groups, such as textile fibers, filaments and fabrics of wool, silk, synthetic polyamide fibers and polyurethane fibers, and for the wash-fast dyeing and printing of natural or regenerated cellulose.

10 Claims, No Drawings

AZO REACTIVE DYESTUFFS

The present invention relates to azo dyestuffs of the formula

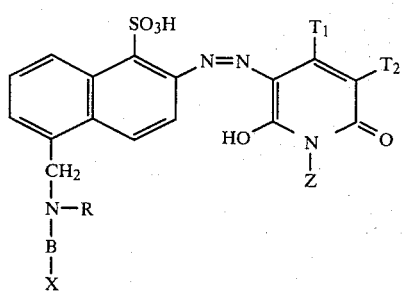

wherein
R=hydrogen or lower alkyl,
$T_1$=hydrogen, optionally substituted alkyl, aralkyl, cycloalkyl, aryl, heteroaryl or a group of the formula —CN, —COOR$_1$R$_2$, —COR$_1$ or —OH,
wherein
$R_1$ and $R_2$ each independently of one another denote hydrogen, optionally substituted alkyl, arakyl, cycloalkyl, aryl or heteroaryl or the group -Nr$_1$R$_2$ represents the radical of a 5-membered or 6-membered heterocyclic ring compound,
$T_2$=hydrogen or optionally substituted alkyl, aralkyl, cycloalkyl, aryl, hereroaryl, a sulpho, a nitro, a nitroso, an alkylsulphonyl, an arylsulphonyl or an acylamino group, a halogen atom, such as chlorine, bromine or fluorine, or a group of the formula —CN, —COOR$_1$R$_2$ or —COR$_1$,
Z=hydrogen, optionally substituted alkyl, aralkyl, cycloakyl, aryl or heteroaryl,
B=a direct bond or a divalent bridge member and
X=an acyl radical.

In the entire description, the terms lower alkyl and "lower alkoxy" denote alkyl and alkoxy radicals with 1-4 carbon atoms.

The optionally substituted alkyl radicals represented by $R_1$, $R_2$, $T_1$, $T_2$ and Z are preferably optionally substituted lower alkyl radicals, specific examples of such radicals being methyl, ethyl, n-propyl and n-butyl, hydroxy-lower alkyl, such as, for example, β-hydroxyethyl, lower alkoxy-lower alkyl, such as, for example, β-(methodxy- or ethoxy)-ethyl, cyanomethyl, carbamoylmethyl, carbethoxymethyl, acetylmethyl and sulphoalkyl.

Benzyl and β-phenylethyl may be mentioned as examples of aralkyl radicals represented by Z, $T_1$, $T_2$, $R_1$ and $R_2$. Cyclohexyl may be mentioned as an example of a cycloalkyl radical represented by Z, $T_1$, $T_2$, $R_1$ and $R_2$. The optionally substituted aryl radicals represented by Z, $T_1$, $T_2$, $R_1$ and $R_2$ are preferably optionally substituted phenyl radicals; specific examples of such radicals are phenyl, tolyl, chlorophenyl, carboxyphenyl, methoxyphenyl and sulphophenyl. The optionally substituted heterocyclic radicals represented by Z, $T_1$, $T_2$, $R_1$ and $R_2$ are preferably optionally substituted 5-membered and 6-membered heterocyclic rings; 2-pyridyl, 2-thiazolyl, 1-piperindinyl and 1-morphlinyl may be mentioned as specific examples of such radicals. Piperidine, morpholine, piperazine and pyrrolidine may be mentioned as examples of 5-membered and 6-membered nitrogen-containing heterocyclic rings which are formed by joining $R_1$, $R_2$ and the nitrogen atom.

Examples of bridge members B are:

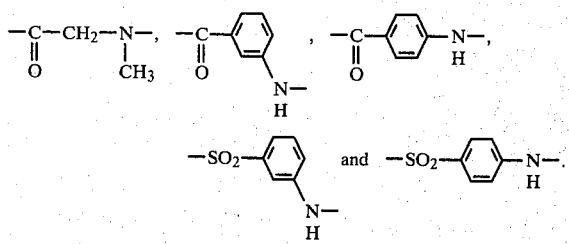

The aryl radical X is the radical of a non-reactive acyl component are of a reactive component.

The following may be mentioned as examples of non-reactive radicals X:

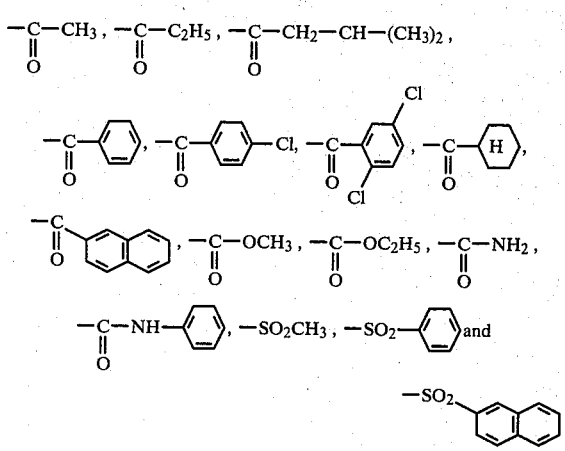

Reactive groups X are to be understood as meaning groups which possess one or more reactive groups or detachable substituents, which, on applying the dyestuffs to cellulose materials in the presence of acid-binding agents, optionally under exposure to heat, are able to react with the hydroxyl groups of the cellulose or, on application to high molecular weight polyamide fibres, such as wool, are able to react with the NH groups of these fibres, to form covalent bonds. A large number of such fibre-reactive groupings are known from the literature.

Reactive groups which are suitable according to the invention and which contain at least one removable substituent bonded to a heterocyclic radical or to an aliphatic radical are inter alia those which contain at least one reactive substituent bonded to a 5-membered or 6-membered heterocyclic ring, such as to a monazine, diazine or triazine ring, for example, a pyridine, pyrimidine, pyridazine, pyrazine, thiazine, oxazine or asymmetrical or symmetrical triazine ring, or to a ring system of this type which contains one or more fused aromatic rings, such as a quinoline, phthalazine, quinnoline, quinazoline, quinoxaline, acridine, phenazine and phenanthridine ring system; the 5-membered or 6-membered heterocyclic rings which possess at least one reactive substituent are, accordingly, preferably those which contain one or more nitrogen atoms and which can contain 5-membered or preferably 6-membered fused carbocyclic rings.

The following may be mentioned as examples of reactive substituents of the heterocyclic structure: halogen (Cl, Br or F), ammonium, including hydrazinium, sulphonium, sulphonyl, azido-(N₃), thiocyanato, thio, thiol-ether, oxyether, sulphinic acid and sulphonic acid. Specific examples to be mentioned are: mono- or dihalogeno-symmetrical-triazinyl radicals; for example 2,4-dichloro-triazinyl-6, 2-amino-4-chlorotriazinyl-6, 2-alkylamino-4-chlorotriazinyl-6, such as 2-methylamino-4-chlorotriazinyl-6, 2-ethylamino- or 2-propylamino-4-chlorotriazinyl-6, 2-β-hydroxyethylamino-4-chlorotriazinyl-6, 2-di-β-hydroxyethylamino-4-chlorotriazinyl-6 and the corresponding sulphuric acid half-esters, 2-diethylamino-4-chlorotriazinyl-6, 2-morpholino- or 2-piperidino-4-chloro-triazinyl-6, 2-cyclohexylamino-4-chlorotriazinyl-6, 2-arylamino- and substituted arylamino-4-chlorotriazinyl-6, such as 2-phenylamino-4-chlorotriazinyl-6, 2-(o-, m- or p-carboxyphenyl or sulphophenyl)-amino-4-chlorotriazinyl-6, 2-alkoxy-4-chlorotriazinyl-6, such as 2-methoxy- or ethoxy-4-chlorotriazinyl-6, 2-(phenylsulphonylmethoxy)-4-chlorotriazinyl-6, 2-aryloxy and substituted aryloxy-4-chlorotriazinyl-6, such as 2-phenoxy-4-chlorotriazinyl-6, 2-(p-sulphophenyl)-oxy-4-chlorotriazinyl-6, 2-(o-, m- or p-methylphenyl or methoxyphenyl)-oxy-4-chloro-triazinyl-6, 2-alkylmercapto- or 2-arylmercapto- or 2-(substituted aryl)-mercapto-4-chlorotriazinyl-6, such as 2-β-hydroxyethylmercapto-4-chlorotriazinyl-6, 2-phenylmercapto-4-chlorotriazinyl-6, 3-(4'-methylphenyl)-mercapto-4-chlorotriazinyl-6, 2-(2', 4'-dinitro)-phenylmercapto-4-chlorotriazinyl-6, 2-methyl-4-chlorotriazinyl-6, 2-phenyl-4-chlorotriazinyl-6, 2-(o-, m- and p-methylphenyl)-amino-4-fluorotriazinyl-6, 2-(o-, m- and p-sulphophenyl)-amino-4-fluoro-triazinyl-6 and 2-(2',5'-dusulphophenyl)-amino-4-fluoro-triazinyl-6, mono-, di- or trihalogenopyrimidinyl-radicals, such as 2,4-dichloropyrimidinyl-6, 2,4,5-trichloropyrimidinyl-6, 2,4-dichloro-5-nitro- or 5-methyl- or -5-carboxymethyl- or -5-carboxy- or -5-cyano or 5-vinyl- or 5-sulpho- or -5-mono, -di- or -tri-chloromethyl or -5-carboalkoxy-pyrimidinyl-6, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloroquinoxaline-3-carbonyl, 2- or 3-mono-chloroquinoxaline-6-carbonyl, 2- or 3-mono-chloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl or -6-carbonyl, 2,4-dichloroquinazoline-7- or -6-sulphonyl or -carbonyl, 2- or 3- or 4-(4',5'-dichloropyridaz-6'-on-1'-yl)phenylsulphonyl or carbonyl, β-(4',5'-dichloropyridaz-6'-on-1'-yl)-ethylcarbonyl, N-methyl-N-(2,4-dichlorotriazinyl-6)-carbamyl, N-methyl-N-(2-methylamino-4-chlorotriazinyl-6)-carbamyl, N-methyl-N-(2-dimethylamino-4-chlorotriazinyl-6)-carbamyl, N-methyl- or N-ethyl-N-(2,4-dichlorotriazinyl-6)-carbamyl, N-methyl- or N-ethyl-N-(2,4-dichlorotriazinyl-6)-aminoacetyl, N-methyl-N-(2,3-dichloroquinoxaline-6-sulphonyl)-aminoacetyl, N-methyl-N-(2,3-dichloroquinoxaline-6-carbonyl)-aminoacetyl and the bromine and fluorine derivatives corresponding to the abovementioned chlorine- substituted heterocyclic radicals, including, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyk-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-trifluoromethyl-4-pyrimidinyl, 2-fluoro-5-phenyl- or -5-methyl-sulphonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulphonyl-4-pyrimidinyl, 2-fluoro-5-sulphonamido-4-pyrimidinyl, 2-fluoro-5-chloro-6-carbomethoxy-4-pyrimidinyl and 2,6-difluoro-5-trifluoromethyl-4-pyrimidinyl; triazine radicals containing sulphonyl groups, such as 2,4-bis-(phenylsulphonyl)-triazinyl-6, 2-(3'-carboxyphenyl)-sulphonyl-4-chlorotriazinyl-6, 2-(3'-sulphophenyl)-sulphonyl-4-chlorotriazinyl-6 and 2,4-bis-(3'-carboxyphenylsulphonyl-)-triazinyl-6; pyrimidine rings containing sulphonyl groups, such as 2-carboxymethylsulphonyl-pyrimidinyl-4, 2-methylsulphonyl-6-methyl-pyrimidinyl-4, 2-methylsulphonyl-6-ethyl-pyrimidinyl-4, 2-phenylsulphonyl-5-chloro-6-methyl-pyrimidinyl, 2,6-bis-methylsulphonyl-pyrimidinyl-4, 2,6-bis-methylsulphonyl-5-chloro-pyrimidinyl-4, 2,4-bis-methyl-sulphonyl-pyrimidine-5-sulphonyl, 2-methylsulphonyl-pyrimidinyl-4, 2-phenylsulphonyl-pyrimidinyl-4, 2-trichloromethylsulphonyl-6-methyl-pyrimidinyl-4, 2-methylsulphonyl-5-chloro-6-methyl-pyrimidinyl-4, 2-methylsulphonyl-5-bromo-6-methyl-pyrimidinyl-4, 2-methylsulphonyl-5-chloro-6-ethyl-pyrimidinyl-4, 2-methylsulphonyl-5-chloro-6-chloro-methyl-pyrimidinyl-4, 2-methylsulphonyl-4-chloro-6-methyl-pyrimidine-5-sulphonyl, 2-methylsulphonyl-5-nitro-6-methyl-pyrimidinyl-4, 2,5,6-tris-methylsulphonyl-pyrimidinyl-4, 2-methylsulphonyl-5,6-dimethyl-pyrimidinyl-4, 2-ethyl-sulphonyl-5-chloro-6-methyl-pyrimidinyl-4, 2-methylsulphonyl-6-chloro-pyrimidinyl-4, 2,6-bis-methylsulphonyl-5-chloro-pyrimidinyl-4, 2-methylsulphonyl-6-carboxy-pyrimidinyl-4, 2-methylsulphonyl-5-sulpho-pyrimidinyl-4, 2-methylsulphonyl-6-carbomethoxy-pyrimidinyl-4, 2-methylsulphonyl-5-carboxy-pyrimidinyl-4, 2-methylsulphonyl-5-cyano-6-methoxy-pyrimidinyl-4, 2-methylsulphonyl-5 -chloro-pyrimidinyl-4, 2-sulphoethylsulphonyl-6-methyl-pyrimidinyl-4, 2-methylsulphonyl-5-bromo-pyrimidinyl-4, 2-phenylsulphonyl-5-chloro-pyrimidinyl-4, 2-carboxymethylsulphonyl- 5-chloro-6-methyl-pyrimidinyl-4, 2-methylsulphonyl-6-chloropyrimidine-4- and -5-carbonyl, 2,6-bis-(methylsulphonyl)-pyrimidine-4- or -5-carbonyl, 2-ethylsulphonyl-6-chloropyrimidine-5-carbonyl, 2,4-bis-(methylsulphonyl)-pyrimidine-5-sulphonyl, 2-methylsulphonyl-4-chloro-6-methylpyrimidine-5-sulphonyl or -carbonyl; triazine rings containing ammonium groups, such as trimethylammonium-4-phenylamino- or -4-(o-, m- or p-sulphophenyl)-aminotriazinyl-6, 2-(1,1-dimethylhydrazinium)-4-phenylamino- or -4-(o-, m- or p-sulphophenyl)-aminotriazinyl-6, 2-(2-isopropylidene-1,1-dimethyl)-hydrazinium-4-phenylamino- or -4-(o-, m- or p-sulphophenyl)-aminotriazinyl-6, 2-N-aminopyrrolidinium or 2-N-aminopiperidinium-4-phenylamino--4-(o-, m- or p-sulphophenyl)-aminotriazinyl-6, and also 4-phenylamino- or 4-(sulphophenylamino)-triazinyl-6 radicals which contain, in the 2-position, 1,4-bis-azabicyclo-[2,2,2]-octane or 1,2-bis-aza-bicyclo-[0,3,3]-octane bonded as a quaternary structure, via a nitrogen bond, 2-pyridinium-4-phenylamino- or -4-(o-, m- or p-sulphophenyl)-aminotriazinyl-6 and corresponding 2-oniumtriazinyl-6- radicals which are substituted in the 4-position by alkylamino, such as methylamino, ethylamino or β-hydroxyethylamino, or alkoxy, such as methoxy or alkoxy, such as phenoxy or sulphophenoxy, groups; 2-chlorobenzthiazole-5- or -6-carbonyl or -5- or -6-sulphonyl, 2-aryl-sulphonyl- or -alkyl-sulphonyl-benzthiazole-5- or -6-carbonyl or -5- or -6-sulphonyl, such as 2-methylsulphonyl- or 2-ethylsulphonyl-benzthiazole-5- or -6-sulphonyl or -carbonyl, 2-phenylsulphonyl-benzthiazole-5- or -6-sulphonyl or carbonyl and the corresponding 2-sulphonylbenzthiazole-5- or -6-carbonyl or -sulphonyl derivatives containing sulpho groups in the fused benzene ring, 2-chlorobenzoaxazole-5- or -6-carbonyl or -sulphonyl, 2-chlorobenzimidazole-5- or -6-carbonyl or -sulphonyl, 2-chloro-1-methylbenzimidazole-5- or -6-carbonyl or sulphonyl, 2-chloro-4-methyl-1,3-thiazole-5-carbonyl or -4- or -5-sulphonyl and the N-oxide of 4-chloro- or 4-nitro-quinoline-5-carboxyl.

In addition, there should be mentioned reactive groups of the aliphatic series, such as acryloyl, monochloroacryloyl, dichloroacryloyl or trichloroacryloyl, such as —CO—CH═CH—Cl, —CO—CCl═CH₂, —CO—CCl═CH—CH₃, —CO—CCl═CH—COOH and —CO—CH═CCl—COOH, β-chloropropionyl, 3-phenylsulphonylpropionyl, 3-methylsulphonylpropionyl, β-sulphatoethylaminosulphonyl, vinylsulphonyl, β-chloro-ethylsulphonyl, β-sulphatoethylsulphonyl, β-methylsulphonylethylsulphonyl, β-phenylsulphonylethylsulphonyl, 2-fluoro-2-chloro-3,3-difluorocyclobutane-1-carbonyl, 2,2,3,3-tetrafluorocyclobutane-1-carbonyl or -1-sulphonyl, β-(2,2,3,3-tetrafluorocyclobutyl-1)-acryloyl, α- or β-bromoacryloyl, and α- or β-alkyl- or aryl-sulphonylacryloyl groups, such as α- or β-methylsulphonylacryloyl.

The azo dyestuffs according to the invention can exist in several tautomeric forms. For simplicity, the dyestuffs have only been shown in one of these tautomeric formulae, but it is self-evident that the description relates to dyestuffs in all possible tautomeric forms.

Preferred dyestuffs corresponding to the formulae

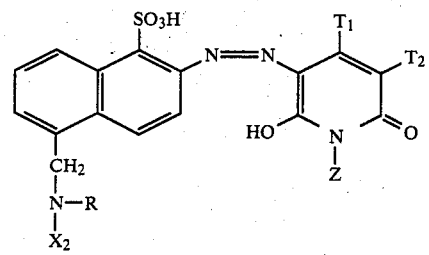

wherein

R, T₁, R₂ and Z have the abovementioned meaning and

X₂ denotes the radical of a reactive component, especially those with X or X₂=dichlorotriazinyl, mono-chlorotriazinyl, trihalogenopyrimidinyl, dihalogenopyrimidinyl or 2,3-dichloroquinoxaline-6-carbonyl or -6-sulphonyl,

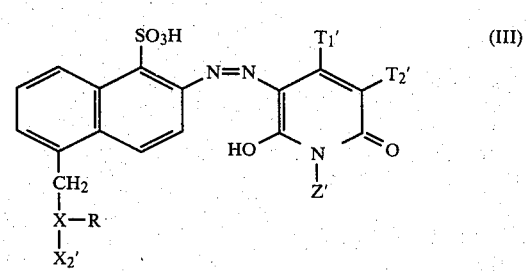

wherein

R has the indicated meaning and

T₁' ... lower alkyl,

T₂' ...

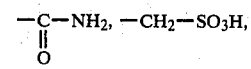

halogen, nitro, sulpho, cyano or H,

Z' ... lower alkyl and

X₂' ... dichlorotriazinyl, monochlorotriazinyl, trihalogenopyrimidinyl, dihalogenopyrimidinyl or 2,3-dichloroquinoxaline-6-carbonyl, dyestuffs of the formula

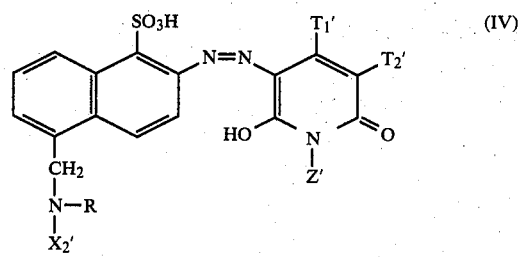

wherein

R and T₁'=lower alkyl,

T₂'=

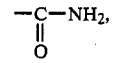

halogen, nitro, sulpho, cyano or H,

Z'=lower alkyl and

X₂'=monofluorotriazinyl, dyestuffs of the formula

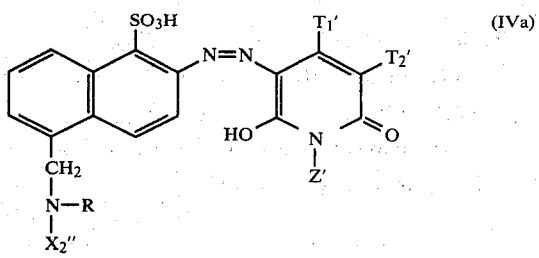

(IVa)

wherein

R and $T_1'$ = lower alkyl, $T_2'$ =

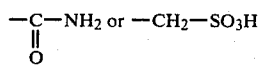

$Z'$ = lower alkyl and $X_2''$ = o- or p-sulphophenylamino-fluorotriazinyl,

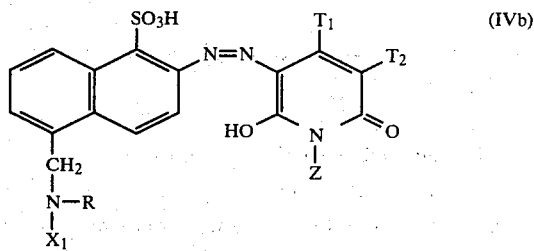

(IVb)

wherein

R, $T_1$, $T_2$ and Z have the abovementioned meaning and $X_1$ represents a non-reactive acyl radical.

The invention further relates to processes for the preparation of the azo dyestuffs of the formula I

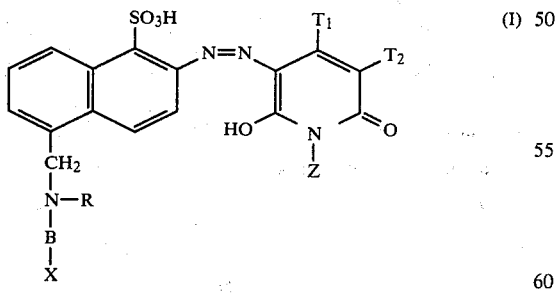

(I)

wherein

R, B, X, $R_1$, $T_2$ and Z have the abovementioned meaning.

The following processes may be mentioned specifically:

1. Amines of the formula

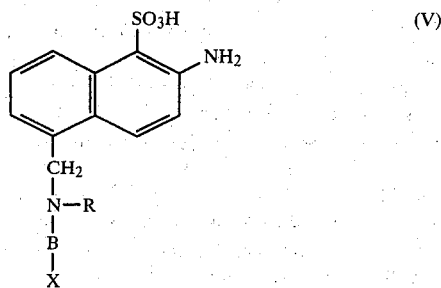

(V)

wherein

B, R and X have the abovementioned meaning are diazotised and coupled with pyridones of the formula

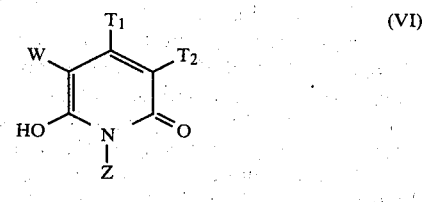

(VI)

wherein $T_1$, $T_2$ and Z have the abovementioned meaning and

W represents a radical detachable during the coupling reaction, or represents a hydrogen atom.

As such radicals which are detachable during coupling there may be mentioned carboxamide, carboxylic acid ester, sulphonamide, sulphonic acid ester, sulphonyl, alkylcarbonyl or arylcarbonyl groups. Suitable detachable radicals W are in particular carboxamide radicals.

2. Dyestuffs of the formula

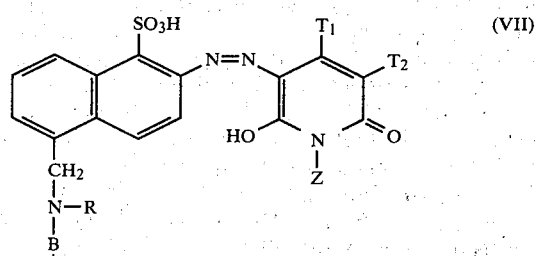

(VII)

wherein

B, R, $T_1$, $T_2$ and Z have the abovementioned meaning are reacted with an acyl component of the formula

Y—X  (VIII)

wherein

X has the abovementioned meaning and

Y represents a detachable group, with elimination of HY.

Amines of the formula V are prepared by condensing amines of the formula

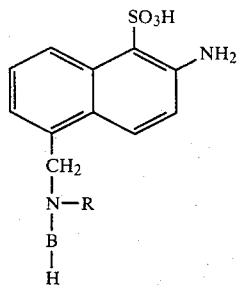

wherein

B and R have the abovementioned meaning, with acyl components of the formula VIII.

Examples of amines of the formula IX are: 2-amino-1-sulpho-5-aminomethyl-naphthalene, 2-amino-1-sulpho-5-N-methylaminomethyl-naphthalene, 2-amino-1-sulpho-5-N-ethylaminomethyl-naphthalene and 2-amino-1-sulpho-5-N-(3′-aminobenzoyl)-amino-methyl-naphthalene (prepared by condensing 2-amino-1-sulpho-5-aminomethyl-naphthalene with 3-nitrobenzoyl chlorde and then reducing the nitro group).

The following may be mentioned as examples of coupling components of the formula VI with W=hydrogen: 2,6-dihydroxypyridine, 2,6-dihydroxy-3-cyano-4-methylpyridine, 1-(methyl- or ethyl)-3-cyano-4-methyl-6-hydroxypyrid-2-one, 1-(β-hydroxyethyl or γ-methoxypropyl)-3-amino-4-(methyl-phenyl or ethyl)-6-hydroxypyrid-2-one, 1-(phenyl, p-tolyl or p-anisyl)-3-cyano-4-(methyl or phenyl)-6-hydroxypyrid-2-one, 1-phenyl-3-(carbamoyl, carboxy or carboethoxy)-4-(methyl or phenyl)-6-hydroxypyrid-2-one, 2,6-dihydroxy-3-(carbamoyl, carboethoxy, or carbodiethylamido)-4-methylpyridine, 2,6-dihydroxy-3-(carbamoyl or carboethoxy)-pyridine, 2,6-dihydroxy-3-carbamoyl-4-phenyl-pyridine, 2,6-dihydroxy-3-cyano-4-carbamoyl-pyridine, 2,6-dihydroxy-3-cyano-4-(carboxy, carbomethoxy or carboethoxy)-pyridine, ethyl-2,6-dihydroxy-3-cyanopyrid-4-yl acetate, 2,6-dihydroxy-3-cyanopyrid-4-ylacetamide, 2,6-dihydroxy-3-cyanopyrid-4-ylacetamide, 2,6-dihydroxy-3,4-di-(carboxy or carboethoxy)-pyridine, 2,6-dihydroxy-3-carbamoyl-4-carboethoxy-pyridine, 2,6-dihydroxy-4-methylpyridine, ethyl 2,6-dihydroxy-iso-nicotinate, 2,6-dihydroxy-iso-nicotinamide, 2,6-dihydroxy-iso-nicotinic acid diethylamide, 2,6-dihydroxy-4-cyanopyridine, 2,6-dihydroxy-4-phenylpyridine, 2,6-dihydroxy-4-(p-hydroxyphenyl)-pyridine, 2,6-dihydroxy-4-(p-methoxyphenyl)-pyridine, 2,4,6-trihydroxy-pyridine, 2,6-dihydroxy-3-cyano-4-ethoxycarbonylmethylpyridine, 4-methyl-1-ethyl-3-carbamoyl-6-hydroxy-pyrid-2-one and 4-methyl-1-phenyl-3-carbamoyl-6-hydroxy-pyrid-2-one, 1,4-dimethyl-3-carbamoyl-6-hydroxy-pyrid-2-one, 1-ethyl-4-methyl-6-hydroxypyrid-2-one, 1-(β-hydroxyethyl)-4-methyl-6-hydroxy-pyrid-2-one, 1-methyl-4-phenyl-6-hydroxy-pyrid-2-one, 1-butyl-4-methyl-6-hydroxy-pyrid-2-one, 1-ethyl-4-hexyl-6-hydroxy-pyrid-2-one, 1-isopropyl-4-methyl-6-hydroxy-pyrid-2-one, 1-ethyl-4-phenyl-6-hydroxy-pyrid-2-one, 1,4-dimethyl-6-hydroxy-pyrid-2-one, 1-(β-methoxyethyl)-4-methyl-6-hydroxy-pyrid-2-one, 1-propyl-4-methyl-6-hydroxy-pyrid-2-one, 1-(:-methylaminoethyl)-4-methyl-6-hydroxypyrid-2-one, 1-ethyl-3-cyano-4-sulphomethyl-6-hydroxypyrid-2-one, 1-phenyl-3-cyano-4-sulphomethyl-6-hydroxypyrid-2-one, 1-methyl-3-aminocarbonyl-4-sulphomethyl-6-hydroxypyrid-2-one, 1-ethyl-4-sulphomethyl-6-hydroxypyrid-2-one, 2,6-dihydroxy-4-sulphomethyl-pyridine, 1-(2′-acetylaminoethyl)-3-cyano-4-sulphomethyl-6-hydroxypyrid-2-one, 1-benzyl-3-aminocarbonyl-4-sulphomethyl-6-hydroxypyrid-2-one, 1-methyl-3-chloro-4-sulphomethyl-6-hydroxypyrid-2-one, 1-isopropyl-3-cyano-4-sulphomethyl-6-hydroxypyrid-2-one, 1-(2′-hydroxyethyl)-3-cyano-4-sulphomethyl-6-hydroxypyrid-2-one, 1-(4′-methoxyphenyl)-3-aminocarbonyl-4-sulphomethyl-6-hydroxypyrid-2-one, 1-(2′-chloroethyl)-3-cyano-4-sulphomethyl-6-hydroxypyrid-2-one, 1-butyl-3-nitroso-4-sulphomethyl-6-hydroxypyrid-2-one, 1-ethyl-3-aminocarbonyl-4-sulphomethyl-6-hydroxypyrid-2-one, 1-methyl-4-sulphomethyl-6-hydroxypyrid-2-one, 1-ethyl-3-methylsulphonyl-4-sulphomethyl-6-hydroxypyrid-2-one, 2,6-dihydroxy-3-aminocarbonyl-4-sulphomethylpyridine, 3-acetylamino-4-sulphomethyl-2,6-dihydroxypyridine, 1-ethyl-3-nitro-4-sulphomethyl-6-hydroxypyrid-2-one, 1-isopropyl-3-chloro-4-sulphomethyl-6-hydroxypyrid-2-one, 1-ethyl-3-bromo-4-sulphomethyl-6-hydroxypyrid-2-one, 1-(4′-chloro-phenyl)-4-sulphomethyl-6-hydroxypyrid-2-one, 1-(4′-acetaminophenyl)-4-sulphomethyl-6-hydroxypyrid-2-one, 1-phenyl-3-aminocarbonyl-4-sulphomethyl-6-hydroxypyrid-2-one, 1-phenyl-3-aminocarbonyl-4-sulphomethyl-6-hydroxypyrid-2-one, 1-methyl-3-cyano-4-sulphomethyl-6-hydroxypyrid-2-one, 2,6-dihydroxy-3-cyano-4-sulphomethyl-pyridine, 1-phenyl-3-acetylamino-4-sulphomethyl-6-hydroxypyrid-2-one, 1-benzyl-3-nitroso-4-sulphomethyl-6-hydroxypyrid-2-one, 1-ethyl-3-sulpho-4-methyl-6-hydroxypyrid-2-one, 1-(β-hydroxyethyl)-3-sulpho-4-methyl-6-hydroxypyrid-2-one, 1-butyl-3-sulpho-4-methyl-6-hydroxypyrid-2-one, 1-isopropyl-3-sulpho-4-methyl-6-hydroxypyrid-2-one, 1,4-dimethyl-3-sulpho-6-hydroxypyrid-2-one, 1-(β-methoxyethyl)-3-sulpho-4-methyl-6-hydroxypyrid-2-one, 1-propyl-3-sulpho-4-methyl-6-hydroxypyrid-2-one, 3-sulpho-4-methyl-2,6-dihydropyridine, 3-sulpho-4-benzyl-2,6-dihydroxypyridine, 1-(4′-chlorophenyl)-3-sulpho-4-methyl-6-hydroxypyrid-2-one, 1-ethyl-3-chloro-4-methyl-6-hydroxypyrid-2-one, 1-(β-hydroxyethyl)-3-chloro-4-methyl-6-hydroxypyrid-2-one, 1-methyl-3-bromo-4-phenyl-6-hydrocypyrid-2-one, 1-butyl-3-fluoro-4-methyl-6-hydroxypyrid-2-one, 1-ethyl-3-fluoro-4-methyl-6-hydroxypyrid-2-one, 1-isopropyl-3-chloro-4-methyl-6-hydroxypyrid-2-one, 1,4-dimethyl-3-bromo-6-hydroxy-pyrid-2-one, 1-(β-methoxyethyl)-3-chloro-4-methyl-6-hydroxypyrid-2-one, 1-propyl-3-chloro-4-methyl-6-hydroxypyrid-2-one, 1-(β-aminoethyl)-3-chloro-4-methyl-6-hydroxypyrid-2-one, 1-(γ-dimethylaminopropyl)-3-chloro-4-methyl-6-hydroxypyrid-2-one, 3-chloro-4-methyl-2,6-dihydroxypyridine, 3-bromo-4-benzyl-2,6-dihydroxypyridine, 1-ethyl-3-sulphomethyl-4-methyl-6-hydroxypyrid-2-one, 1-(β-hydroxyethyl)-3-sulphomethyl-4-methyl-6-hydroxypyrid-2-one, 1-methyl-3-sulphomethyl-4-phenyl-6-hydroxypyrid-2-one, 1-butyl-3-sulphomethyl-4-methyl-6-hydroxypyrid-2-one, 1-ethyl-3-α-sulphoethyl-4-methyl-6-hydroxypyrid-2-one, 1-isopropyl-3-α-sulphoethyl-4-methyl-6-hydroxypyrid-2-one, 1,4-dimethyl-3-sulphomethyl-6-hydroxypyrid-2-one, 1-(β-methoxyethyl)-3-sulphomethyl-4-methyl-6-hydroxypyrid-2-one, 1-propyl-3-sulphomethyl-4-methyl-6-hydroxypyrid-2-one, 1-(β-acetylaminoethyl)-3-sulphomethyl-4-methyl-6-hydroxypyrid-2-one, 1-(γ-dimethylaminopropyl)-3-sulphomethyl-4-methyl-6-hydroxypyrid-2-one, 3-sulphomethyl-4-methyl-2,6-dihydroxypyridine, 3-sulphomethyl-4-benzyl-2,6-dihydroxypyridine, 1-ethyl-3-(α-phenyl)-sulphomethyl-4-benzyl-6-hydroxypyrid-2-one, 1-methyl-3-(α,4'-acetylaminophenyl)-sulphomethyl-4-methyl-6-hydroxypyrid-2-one and 3-(α-2'-sulphophenyl)-sulphomethyl-4-phenyl-2,6-dihydroxypyridine.

The following may be listed as examples of coupling components of the formula VI with W=a detachable group: 1,4-dimethyl-3-chloro-5-carboethoxy-6-hydroxy-pyrid-2-one, 1-ethyl-4-methyl-3-chloro-5-carbamoyl-6-hydroxy-pyrid-2-one, 1,4-dimethyl-3-bromo-5-carbamoyl-6-hydroxy-pyrid-2-one, 1-ethyl-4-isopropyl-3-chloro-5-carbamoyl-6-hydroxy-pyrid-2-one, 1,4-diethyl-3-chloro-5-carbamoyl-6-hydroxy-pyrid-2-one, 1,4-dimethyl-3-sulphomethyl-5-carboethoxy-6-hydroxypyrid-2-one, 1,4-dimethyl-3-sulphomethyl-5-acetyl-6-hydroxy-pyrid-2-one, 1-ethyl-4-methyl-3-sulphomethyl-5-acetyl-6-hydroxypyrid-2-one, 1,4-dimethyl-3-sulphomethyl-5-benzoyl-6-hydroxy-pyrid-2-one, 1,4-dimethyl-3-α-sulphoethyl-5-carbamoyl-6-hydroxy-pyrid-2-one, 1-ethyl-4-isopropyl-3-sulphomethyl-5-carbamoyl-6-hydroxy-pyrid-2-one, 1,4-diethyl-3-sulphomethyl-5-carbamoyl-6-hydroxy-pyrid-2-one, 1-methyl-4-isopropyl-3-sulphomethyl-5-carbamoyl-6-hydroxy-pyrid-2-one, 1-ethyl-4-propyl-3-sulphomethyl-5-carbamoyl-6-hydroxy-pyrid-2-one, 1-ethyl-4-methyl-3-sulphomethyl-5-carbamoyl-6-hydroxy-pyrid-2-one, 1-ethyl-4-methyl-3-sulphomethyl-5-N,N-dimethylcarbamoyl-6-hydroxy-pyrid-2-one, 1-ethyl-4-methyl-3-sulphomethyl-5-phenylsulphonyl-6-hydroxy-pyrid-2-one, 1-ethyl-4-methyl-3-sulphomethyl-5-sulphamoyl-6-hydroxypyrid-2-one, 4-methyl-3-sulphomethyl-5-carbamoyl-2,6-dihydroxy-pyridine, 1,4-dimethyl-3-sulphomethyl-5-methyl-sulphonyl-6-hydroxy-pyrid-2-one, 1,4-diethyl-3-sulphomethyl-5-methylsulphonyl-6-hydroxy-pyrid-2-one, 1-ethyl-4-methyl-3-sulphomethyl-5-methylsulphonyl-6-hydroxy-pyrid-2-one, 1-ethyl-4-methyl-3-sulphomethyl-5-N-methylcarbamoyl-6-hydroxy-pyrid-2-one and 1-ethyl-3-aminocarbonyl-4-methyl-5-(α-3'-nitrophenyl)-sulphomethyl-6-hydroxy-pyrid-2-one.

Dyestuffs of the formula VII are prepared by diazotising amines of the formula IX, in which B represents a direct bond, and coupling the product with pyridones of the formula VI.

The following may be mentioned as examples of acyl components of the formula VIII:

(1) Non-reactive acyl components: acetyl chloride, propionyl chloride, isovaleroyl chloride, benzoyl chloride, 4-chlorobenzoyl chloride, 2,5-dichlorobenzoyl chloride, cyclohexanecarboxylic acid chloride, β-naphthoyl chloride, diphenylcarboxylic acid chloride, phenylacetic acid chloride, methyl chloroformate, ethyl chloroformate, isopropyl chloroformate, methyl isocyanate, phenyl isocyanate, methanesulphonic acid chloride, benzenesulphonic acid chloride and β-naphthalenesulphonic acid chloride.

(2) Reactive components: suitable reactive components of the formula VIII are, for example, those on which the abovementioned reactive groups are based, that is to say, in general, the halides, especially the chlorides, of the acyl components Z which have been mentioned. Amongst the large number of available compounds, the following may be mentioned here as a selection: trihalogeno-symmetrical-triazines, such as cyanuric chloride and cyanuric bromide, dihalogeno-monoamino- and -monosubstituted amino-symmetrical triazines, such as 2,6-dichloro-4-amino-triazine, 2,6-dichloro-4-methylaminotriazine, 2,6-dichloro-4-ethylaminotriazine, 2,6-dichloro-4-oxyethylaminotriazine, 2,6-dichloro-4-phenylaminotriazine, 2,6-dichloro-4-(o-, m- or p-sulphophenyl)aminotriazine, 2,6-dichloro-4-(2',3'-, 2',4'-, 3',4'- or -3',5'-disulphophenyl)-aminotriazine, dihalogeno-alkoxy- and aryloxy-sym.-triazines, such as 2,6-dichloro-4-methoxytriazine, 2,6-dichloro-4-ethoxytriazine, 2,6-dichloro-4-phenoxytriazine and 2,6-dichloro-4-(o-, m- or p-sulphophenyl)-oxytriazine, dihalogeno-alkylmercapto- and -arylmercapto-sym.triazines, such as 2,6-dichloro-4-ethylmercaptotriazine, 2,6-dichloro-4-phenylmercaptotriazine, 2,6-dichloro-4-(p-methylphenyl)-mercaptotriazine, 2,4-difluoro-6-(o-, m- or p-methyl-phenyl)-amino-triazine, 2,4-difluoro-6-(o-, m- or p-sulphophenyl)-amino-triazine, 2,4-difluoro-6-methoxy-triazine, 2,4-difluoro-6-(2',5'-disulphophenyl)-amino-triazine and 2,4-difluoro-6-(6'-sulphonaphthyl-2')-amino-triazine, tetrahalogenopyrimidines, such as tetrachloro-, tetrabromo- or tetrafluoro-pyrimidine, 2,4,6-trihalogenopyrimidines, such as 2,4,6-trichloro-, tribromo- or -trifluoro-pyrimidine, dihalogenopyrimidines, such as 2,4-dichloro-, -dibromo- or -difluoropyrimidine, 2,4,6-trichloro-5-nitro- or -5-methyl- or -5-carbomethoxy- or -5-carboethoxy- or -5-carboxymethyl- or -5-mono-, -di- or -trichloromethyl- or -5-carboxy- or -5-sulpho- or -5-cyano- or -5-vinyl-pyrimidine, 2,4-difluoro-6-methylpyrimidine, 2,6-difluoro-4-methyl-5-chloropyrimidine, 2,4-difluoro-pyrimidine-5-ethylsulphone, 2,6-difluoro-4-chloro-pyrimidine, 2,4,6-trifluoro-5-chloropyrimidine, 2,6-difluoro-4-methyl-5-bromopyrimidine, 2,4-difluoro-5,6-dichloro- or -dibromopyrimidine, 4,6-difluoro-2,5-dichloro- or -dibromopyrimidine, 2,6-difluoro-4-bromopyrimidine, 2,4,6-trifluoro-5-bromopyrimidine, 2,4,6-trifluoro-5-chloromethylpyrimidine, 2,4,6-trifluoro-5-nitropyrimidine, 2,4,6-trifluoro-5-cyanopyrimidine, 2,4,6-trifluoropyrimidine-5-carboxylic acid alkyl esters or -5-carboxylic acid amides, 2,6-difluoro-5-methyl-4-chloropyrimidine, 2,6-difluoro-5-chloropyrimidine, 2,4,6-trifluoro-5-methylpyrimidine, 2,4,5-trifluoro-6-methylpyrimidine, 2,4-difluoro-5-nitro-6-chloropyrimidine, 2,4-difluoro-5-cyanopyrimidine, 2,4-difluoro-5-methylpyrimidine, 6-trifluoromethyl-5-chloro-2,4-difluoropyrimidine, 6-phenyl-2,4-difluoropyrimidine, 6-trifluoromethyl-2,4-difluoropyrimidine, 5-trifluoromethyl-2,4,6-trifluoropyrimidine, 2,4-difluoro-5-nitro-pyrimidine, 2,4-difluoro-5-trifluoromethylpyrimidine, 2,4-difluoro-5-methylsulphonyl-pyrimidine, 2,4-difluoro-5-phenyl-pyrimidine, 2,4-difluoro-5-carboxamidopyrimidine, 2,4-difluoro-5-carbomethoxy-pyrimidine, 2,4-difluoro-6-trifluoromethylpyrimidine, 2,4-difluoro-6-carboxamido-pyrimidine, 2,4-difluoro-6-carbomethoxy-pyrimidine, 2,4-difluoro-6-phenyl-pyrimidine, 2,4-difluoro-6-cyanopyrimidine, 2,4,6-trifluoro-5-methylsulphonyl-pyrimidine, 2,4-difluoro-5-sulphonamido-pyrimidine, 2,4-difluoro-5-chloro-6-carbomethoxy-pyrimidine, 5-trifluoromethyl-2,4-difluoropyrimidine, 2,4-dichloropyrimidine-5-carboxylic acid chloride, 2,4,6-trichloropyrimidine-5-carboxylic acid chloride, 2-methyl-4-chloropyrimidine-5-carboxylic acid chloride, 2-chloro-4-methylpyrimidine-5-carboxylic acid chloride and 2,6-dichloropyrimidine-4-carboxylic acid chloride; pyrimidine reactive components with detachable sulphonyl groups, such as 2-carboxymethylsulphonyl-4-chloropyrimidine, 2-methylsulphonyl-4-chloro-6-methylpyrimidine, 2,4-bis-methylsulphonyl-6-methylpyrimidine, 2,4-bis-phenylsulphonyl-5-chloro-6-methylpyrimidine, 2,4,6-trismethylsulphonylpyrimidine, 2,6-bis-methylsulphonyl-4,5-dichloropyrimidine, 2,4-bis-methylsulphonylpyrimidine-5-sulphonic acid chloride, 2-methylsulphonyl-4-chloropyrimidine, 2-phenylsulphonyl-4-chloropyrimidine, 2,4-bis-trichloromethylsulphonyl-6-methylpyrimidine, 2,4-bis-methylsulphonyl-5-chloro-6-methylpyrimidine, 2,4-bis-methylsulphonyl-5-bromo-6-methylpyrimidine, 2-methylsulphonyl-4,5-dichloro-6-methylpyrimidine, 2-methylsulphonyl-4,5-dichloro-6-chloromethylpyrimidine, 2-methylsulphonyl-4-chloro-6-methylpyrimidine-5-sulphonic acid chloride, 2-methylsulphonyl-4-chloro-5-nitro-6-methylpyrimidine, 2,4,5,6-tetramethylsulphonylpyrimidine, 2-methylsulphonyl-4-chloro-5,6-dimethylpyrimidine, 2-ethylsulphonyl-4,5-dichloro-6-methylpyrimidine, 2-methylsulphonyl-4,6-dichloropyrimidine, 2,4,6-tris-methylsulphonyl-5chloropyrimidine, 2-methylsulphonyl-4-chloro-6-carboxypyrimidine, 2-methylsulphonyl-4-chloropyrimidine-5-sulphonic acid, 2-methylsulphonyl-4-chloro-6-carbomethoxy-pyrimidine, 2-methylsulphonyl-4-chloro-pyrimidine-5-carboxylic acid, 2-methylsulphonyl-4-chloro-5-cyano-6-methoxy-pyrimidine, 2-methylsulphonyl-4,5-dichloropyrimidine, 4,6-bis-methylsulphonylpyrimidine, 4-methylsulphonyl-6-chloropyrimidine, 2-sulphoethylsulphonyl-4-chloro-6-methylpyrimidine, 2-methylsulphonyl-4-chloro-5-bromopyrimidine, 2-methylsulphonyl-4-chloro-5-bromo-6-methylpyrimidine, 2,4-bis-methylsulphonyl-5-chloropyrimidine, 2-phenylsulphonyl-4,5-dichloropyrimidine, 2-phenylsulphonyl-4,5-dichloro-6-methylpyrimidine, 2-carboxymethylsulphonyl-4,5-dichloro-6-methylpyrimidine, 2-(2'- or 3' or 4'-carboxyphenylsulphonyl)-4,5-dichloro-6-methylpyrimidine, 2,4-bis-(2'- or 3'- or 4'-carboxyphenylsulphonyl)-5-chloro-6-methylpyrimidine, 2-methylsulphonyl-6-chloropyrimidine-4- or -5-carboxylic acid chloride, 2-ethylsulphonyl-6-chloropyrimidine-4- or -5-carboxylic acid chloride, 2,6-bis-(methylsulphonyl)pyrimidine-4-carboxylic acid chloride, 2-methylsulphonyl-6-methyl-4-chloro- or -4-bromopyrimidine-5-carboxylic acid chloride or bromide and 2,6-bis-(methylsulphonyl)-4-chloropyrimidine-5-carboxylic acid chloride; examples of further reactive components of the heterocyclic series, possessing reactive sulphonyl substituents, are 3,6-bis-phenylsulphonylpyridazine, 3-methylsulphonyl-6-chloropyridazine, 3,6-bis-trichloromethylsulphonylpyridazine, 3,6-bis-methylsulphonyl-4-methylpyridazine, 2,5,6-tris-methylsulphonylpyrazine, 2,4-bis-methylsulphonyl-1,3,5-triazine, 2,4-bis-methylsulphonyl-6-(3'-sulphophenylamino)-1,3,5-triazine, 2,4-bis-methylsulphonyl-6-N-methylanilino-1,3,5-triazine, 2,4-bis-methylsulphonyl-6-phenoxy-1,3,5-triazine, 2,4-bis-methylsulphonyl-6-trichloroethoxy-1,3,5-triazine, 2,4,6-tris-phenylsulphonyl-1,3,5-triazine, 2,4-bis-methylsulphonylquinazoline, 2,4-bis-trichloromethylsulphonylquinoline, 2,4-bis-carboxymethylsulphonylquinoline, 2,6-bis-(methylsulphonyl)-pyridine-4-carboxylic acid chloride and 1-(4'-chlorocarbonylphenyl or 2'-chlorocarbonylethyl)-4,5-bis-methylsulphonyl-pyridaz-6-one; other heterocyclic reactive components with mobile halogen are, inter alia, 2- or 3-monochloroquinoxaline-6-carboxylic acid chloride or -6-sulphonic acid chloride, 2- or 3-monobromoquinoxaline-6-carboxylic acid bromide or -6-sulphonic acid bromide, 2,3-dichloroquinoxaline-6-carboxylic acid chloride or -6-sulphonic acid chloride, 2,3-dibromoquinoxaline-6-carboxylic acid bromide or -6-sulphonic acid bromide, 1,4-dichlorophthalazine-6-carboxylic acid chloride or -6-sulphonic acid chloride and the corresponding bromine compounds, 2,4-dichloroquinazoline-6- or -7-carboxylic acid chloride or -7-sulphonic acid chloride and the corresponding bromine compounds, 2- or 3- or 4-(4'-, 5'-dichloropyridaz-6'-on-1'-yl)-phenylsulphonic acid chloride or -carboxylic acid chloride and the corresponding bromine compounds, β-(4',5'-dichloropyridaz-6'-on-1'-yl)-ethylcarboxylic acid chloride, 2-chloroquinoxaline-3-carboxylic acid chloride and the corresponding bromine compound, N-methyl-N-(2,4-dichlorotriazinyl-6)-carbamic acid chloride, N-methyl-N-(2-chloro-4-methylamino-triazinyl-6)-carbamic acid chloride, N-methyl-N-(2-chloro-4-dimethylamino-triazinyl-6)-carbamic acid chloride, N-methyl- or N-ethyl-N-(2,4-dichlorotriazinyl-6)-aminoacetyl chloride, N-methyl-, N-ethyl- or N-hydroxyethyl-N-(2,3-dichloroquinoxaline-6-sulphonyl- or -6-carbonyl)-aminoacetyl chloride and the corresponding bromine derivatives, and also 2-chlorobenzthiazole-5- or -6-carboxylic acid chloride or -5- or -6-sulphonic acid chloride and the corresponding bromine compounds, 2-arylsulphonyl- or 2-alkylsulphonyl-benzthiazole-5- or -6-carboxylic acid chloride or -5- or -6-sulphonic acid chloride, such as 2-methylsulphonyl- or 2-ethylsulphonyl- or 2-phenylsulphonyl-benzthiazole-5- or -6-sulphonic acid chloride or -5- or -6-carboxylic acid chloride and the corresponding 2-sulphonyl-benzthiazole derivatives containing sulphonic acid groups in the fused benzene ring, 3,5-bis-methylsulphonyl-isothiazole-4-carboxylic acid chloride, 2-chloro-benzoxazole-5- or -6-carboxylic acid chloride or -sulphonic acid chloride and the corresponding bromine derivatives, 2-chlorobenzimidazole-5- or -6-carboxylic acid chloride or -sulphonic acid chloride and the corresponding bromine derivatives, 2-chloro-1-methylbenzimidazole-5- or -6-carboxylic acid chloride or -sulphonic acid chloride and the corresponding bromine derivatives, 2-chloro-4-methyl-1,3-thiazole-5-carboxylic acid chloride or -4- or -5-sulphonic acid chloride, 2-chlorothiazole-4- or -5-sulphonic acid chloride and the corresponding bromine derivatives.

The following may be mentioned as examples from the series of the aliphatic reactive components: acrylic acid chloride, mono-, di- or tri-chloro-acrylic acid chloride, 3-chloropropionic acid chloride, 3-phenylsulphonyl-propionic acid chloride, 3-methyl-sulphonylpropionic acid chloride, 3-ethyl-sulphonylpropionic acid chloride, 3chloroethanesulphochloride, chloromethanesulphochloride, 2-chloroacetylchloride, 2,2,3,3-tetrafluorocyclobutane-1-carboxylic acid chloride, β-(2,2,3,3-tetraflurocyclobutyl-1)-acrylic acid chloride, β-(2,3,3-trifluoro-2-chlorocyclobutane-1)-carboxylic acid chloride, β-methylsulphonyl-acrylic acid chloride, α-methylsulphonyl-acrylic acid chloride and α-bromoactylic acid chloride and β-bromoacrylic acid chloride.

If the conversion leads to dyestuffs which possess more than one reactive group in the radical Z or at some other point of the dyestuff molecule, these groups can in part be replaced by other radicals, for example amino radicals, which in turn can contain reactive groups, for example in the form of esterified hydroxyalkyl groups. In principle, it is possible for two or more mutually different reactive groups to be present in the dyestuff.

The novel dyestuffs of the formula (I) with X=a reactive acyl radical are suitable for dyeing and printing materials containing hydroxyl groups or containing amide groups, such as textile fibres, yarns and fabrics of wool, silk, synthetic polyamide and polyurethane fibres, and for the wash-fast dyeing and printing of natural or regenerated cellulose, the treatment of cellulose materials advantageously being carried out in the presence of acid-binding agents, and if appropriate by exposure to heat, in accordance with the processes which have been disclosed for reactive dyestuffs.

The new dyestuffs of the formula (I) with X=a non-reactive acyl radical are suitable for dyeing and printing natural and synthetic fibre materials, especially fibre materials containing nitrogen atoms, such as wool and polyamide fibres, the latter being understood in particular as polyamide fibres of synthetic polyamides, such as ε-polycaprolactam or condensation products of adipic acid and hexamethylenediamine.

The formulae shown for the dyestuffs are those of the corresponding free acids. In general, the dyestuffs were isolated, and employed for dyeing, in the form of the alkali metal salts, especially the Na salts.

The weights mentioned in the examples relate to the free acid.

EXAMPLE 1

17.3 g of m-sulphanilic acid (amine component) are dissolved in 0.8 liter of ice water. 13.5 g of 2,4,6-trifluoro-1,3,5-triazine are then run in dropwise, and at the same time dilute sodium hydroxide solution is added in order to maintain a pH of 2.5–3. After addition of the cyanuric fluoride stirring is continued for some minutes, and then a solution of 45.9 g of 1-sulpho-5-amino-methyl-naphthalene<2 azo 5>-1-ethyl-3-carbamoyl-4-methyl-6-hydroxy-pyrid-2-one in 1 liter of water and 14 ml of concentrated sodium hydroxide solution (d=1.5) is added dropwise at 0°–5°, without exceeding a pH of 8.5. The mixture is stirred at 8–8.5 until there is no further change in the pH. The dyestuff is separated out from the clear solution with 25% by volume of sodium chloride. After filtering off, drying and grinding, a powder which is readily soluble in water, giving a yellow colour, is obtained. The dyestuff corresponds to the formula

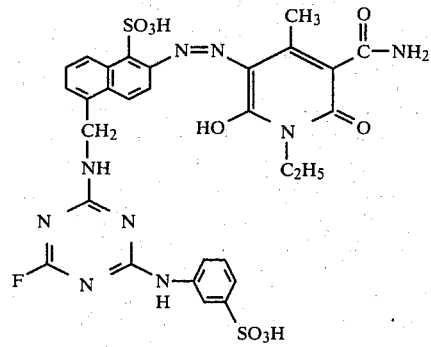

The dyestuff employed for the acylation is prepared by diazotising 2-amino-1-sulpho-5-aminomethyl-naphthalene and coupling with 1-ethyl-3-carbamoyl-4-methyl-6-hydroxypyrid-2-one in a neutral to weakly acid medium.

If the instructions in this example are followed, but using the amine, diazo and coupling components listed in the table below, valuable dyestuffs are again obtained.

| Example | Amine component | Diazo component | Coupling component | Colour shade |
|---|---|---|---|---|
| 2 | p-Sulphanilic acid | 2-Amino-1-sulpho-5-aminomethyl-naphthalene | 1-Ethyl-3-carbamoyl-4-methyl-6-hydroxy-pyrid-2-one | greenish-tinged yellow |
| 3 | o-Sulphanilic acid | 2-Amino-1-sulpho-5-aminomethyl-naphthalene | 1-Ethyl-3-carbamoyl-4-methyl-6-hydroxy-pyrid-2-one | greenish-tinged yellow |
| 4 | 1-Amino-2-methyl-4-sulpho-benzene | 2-Amino-1-sulpho-5-aminomethyl-naphthalene | 1-Ethyl-3-carbamoyl-4-methyl-6-hydroxy-pyrid-2-one | greenish-tinged yellow |
| 5 | 1-Amino-2-methyl-5-sulpho-benzene | 2-Amino-1-sulpho-5-aminomethyl-naphthalene | 1-Ethyl-3-carbamoyl-4-methyl-6-hydroxy-pyrid-2-one | greenish-tinged yellow |
| 6 | 1-Amino-2-methoxy-4-sulpho-benzene | 2-Amino-1-sulpho-5-aminomethyl-naphthalene | 1-Ethyl-3-carbamoyl-4-methyl-6-hydroxy-pyrid-2-one | greenish-tinged yellow |
| 7 | 1-Amino-2-methoxy-5-sulpho-benzene | 2-Amino-1-sulpho-5-aminomethyl-naphthalene | 1-Ethyl-3-carbomoyl-4-methyl-6-hydroxy-pyrid-2-one | greenish-tinged yellow |
| 8 | 1-Amino-2-chloro-4-sulpho-benzene | 2-Amino-1-sulpho-5-aminomethyl-naphthalene | 1-Ethyl-3-carbamoyl-4-methyl-6-hydroxy-pyrid-2-one | greenish-tinged yellow |
| 9 | 1-Amino-2-chloro-5-sulpho-benzene | 2-Amino-1-sulpho-5-aminomethyl-naphthalene | 1-Ethyl-3-carbamoyl-4-methyl-6-hydroxy-pyrid-2-one | greenish-tinged yellow |
| 10 | 1-Amino-4-sulpho-naphthalene | 2-Amino-1-sulpho-5-aminomethyl-naphthalene | 1-Ethyl-3-carbamoyl-4-methyl-6-hydroxy-pyrid-2-one | greensih-tinged yellow |
| 11 | 2-Amino-5-sulpho-naphthalene | 2-Amino-1-sulpho-5-aminomethyl-naphthalene | 1-Ethyl-3-carbamoyl-4-methyl-6-hydroxy-pyrid-2-one | greenish-tinged yellow |
| 12 | 2-Amino-6-sulpho-naphthalene | 2-Amino-1-sulpho-5-aminomethyl-naphthalene | 1-Ethyl-3-carbamoyl-4-methyl-6-hydroxy-pyrid-2-one | greenish-tinged yellow |
| 13 | m-Sulphanilic acid | 2-Amino-1-sulpho-5-aminomethyl-naphthalene | 1,4-Dimethyl-3-carbamoyl-6-hydroxy-pyrid-2-one | greenish-tinged yellow |
| 14 | p-Sulphanilic acid | | 1,4-Dimethyl-3-carbamoyl- | greenish- |

-continued

| Example | Amine component | Diazo component | Coupling component | Colour shade |
|---|---|---|---|---|
| 15 | o-Sulphanilic acid | | 6-hydroxy-pyrid-2-one 1,4-Dimethyl-3-carbamoyl-6-hydroxy-pyrid-2-one | tinged yellow greenish-tinged yellow |
| 16 | 1-Amino-2-methyl-4-sulpho-benzene | 2-Amino-1-sulpho-5-aminomethyl-naphthalene | 1,4-Dimethyl-3-carbamoyl-6-hydroxy-pyrid-2-one | strongly greenish-tinged yellow |
| 17 | 1-Amino-2-methyl-5-sulpho-benzene | 2-Amino-1-sulpho-5-aminomethyl-naphthalene | 1,4-Dimethyl-3-carbamoyl-6-hydroxy-pyrid-2-one | strongly greenish-tinged yellow |
| 18 | 1-Amino-2-ethoxy-5-sulpho-benzene | 2-Amino-1-sulpho-5-aminomethyl-naphthalene | 1,4-Dimethyl-3-carbamoyl-6-hydroxy-pyrid-2-one | strongly greenish-tinged yellow |
| 19 | 1-Amino-2-chloro-5-sulpho-benzene | 2-Amino-1-sulpho-5-aminomethyl-naphthalene | 1,4-Dimethyl-3-carbamoyl-6-hydroxy-pyrid-2-one | strongly greenish-tinged yellow |
| 20 | m-Sulphanilic acid | 2-Amino-1-sulpho-5-N-methylaminomethyl-naphthalene | 1,4-Dimethyl-3-carbamoyl-6-hydroxy-pyrid-2-one | strongly greenish-tinged yellow |
| 21 | p-Sulphanilic acid | 2-Amino-1-sulpho-5-N-methylaminomethyl-naphthalene | 1,4-Dimethyl-3-carbamoyl-6-hydroxy-pyrid-2-one | strongly greenish-tinged yellow |
| 22 | o-Sulphanilic acid | 2-Amino-1-sulpho-5-N-methylaminomethyl-naphthalene | 1,4-Dimethyl-3-carbamoyl-6-hydroxy-pyrid-2-one | strongly greenish-tinged yellow |
| 23 | 1-Amino-2-methyl-5-sulpho-benzene | 2-Amino-1-sulpho-5-N-methylaminomethyl-naphthalene | 1,4-Dimethyl-3-carbamoyl-6-hydroxy-pyrid-2-one | strongly greenish-tinged yellow |
| 24 | 1-Amino-2-methyl-4-sulpho-benzene | 2-Amino-1-sulpho-5-N-methylaminomethyl-naphthalene | 1,4-Dimethyl-3-carbamoyl-6-hydroxy-pyrid-2-one | strongly greenish-tinged yellow |
| 25 | 1-Amino-2-chloro-5-sulpho-benzene | 2-Amino-1-sulpho-5-N-methylaminomethyl-naphthalene | 1,4-Dimethyl-3-carbamoyl-6-hydroxy-pyrid-2-one | strongly greenish-tinged yellow |
| 26 | 1-Amino-2-methoxy-5-sulpho-benzene | 2-Amino-1-sulpho-5-N-methylaminomethyl-naphthalene | 1,4-Dimethyl-3-carbamoyl-6-hydroxy-pyrid-2-one | strongly greenish-tinged yellow |
| 27 | m-Sulphanilic acid | 2-Amino-1-sulpho-5-aminomethyl-naphthalene | 1-β-Methoxy-ethyl-3-carbamoyl-4-methyl-6-hydroxy-pyrid-2-one | strongly greenish-tinged yellow |
| 28 | p-Sulphanilic acid | 2-Amino-1-sulpho-5-aminomethyl-naphthalene | 1-β-Methoxy-ethyl-3-carbamoyl-4-methyl-6-hydroxy-pyrid-2-one | strongly greenish-tinged yellow |
| 29 | 1-Amino-4-(4'-aminoanilino)-anthraquinone-2,2'-disulphonic acid | 2-Amino-1-sulpho-5-aminomethyl-naphthalene | 1-Ethyl-3-carbamoyl-4-methyl-6-hydroxy-pyrid-2-one | green |
| 30 | 1-Amino-4-(4'-aminoanilino)-anthraquinone-2,3'-disulphonic acid | 2-Amino-1-sulpho-5-aminomethyl-naphthalene | 1-Ethyl-3-carbamoyl-4-methyl-6-hydroxy-pyrid-2-one | green |
| 31 | 1-Amino-4-(4'-aminoanilino)-anthraquinone-2,2',5'-trisulphonic acid | 2-Amino-1-sulpho-5-aminomethyl-naphthalene | 1-Ethyl-3-carbamoyl-4-methyl-6-hydroxy-pyrid-2-one | green |
| 32 | 1-Amino-4-(3'-aminoanilino)-anthraquinone-2,4'-disulphonic acid | 2-Amino-1-sulpho-5-aminomethyl-naphthalene | 1-Ethyl-3-carbamoyl-4-methyl-6-hydroxy-pyrid-2-one | green |
| 33 | 1-Amino-4-(3'-aminoanilino)-anthraquinone-2,4',6'-trisulphonic acid | 2-Amino-1-sulpho-5-aminomethyl-naphthalene | 1-Ethyl-3-carbamoyl-4-methyl-6-hydroxy-pyrid-2-one | green |
| 34 | 1-Amino-4-(3'-amino-4'-methyl-anilino)-anthraquinone-2,6'-disulphonic acid | 2-Amino-1-sulpho-5-aminomethyl-naphthalene | 1-Ethyl-3-carbamoyl-4-methyl-6-hydroxy-pyrid-2-one | green |
| 35 | 1-Amino-4-(2'-methyl-3'-aminoanilino)-anthraquinone-2,5'-disulphonic acid | 2-Amino-1-sulpho-5-aminomethyl-naphthalene | 1-Ethyl-3-carbamoyl-4-methyl-6-hydroxy-pyrid-2-one | green |
| 36 | $[CuPc-3-SO_2NH_2(SO_3H)_{1.5}(SO_2NH-C_6H_3(NH_2)(SO_3H)_{1.2})]$ | 2-Amino-1-sulpho-5-aminomethyl-naphthalene | 1-Ethyl-3-carbamoyl-4-methyl-6-hydroxy-pyrid-2-one | green |

-continued

| Example | Amine component | Diazo component | Coupling component | Colour shade |
|---------|----------------|-----------------|-------------------|--------------|
| 37 | NiPc—3-SO$_2$NH$_2$—(SO$_3$H)$_{1.5}$—(SO$_2$NH—C$_6$H$_3$(NH$_2$)—SO$_3$H$_{1.2}$) | 2-Amino-1-sulpho-5-aminomethyl-naphthalene | 1-Ethyl-3-carbamoyl-4-methyl-6-hydroxy-pyrid-2-one | green |
| 38 | m-Sulphanilic acid | 2-Amino-1-sulpho-5-aminomethyl-naphthalene | 1-Ethyl-3-nitro-4-methyl-6-hydroxy-pyrid-2-one | yellow |
| 39 | m-Sulphanilic acid | 2-Amino-1-sulpho-5-aminomethyl-naphthalene | 1-Ethyl-3-chloro-4-methyl-6-hydroxy-pyrid-2-one | yellow |
| 40 | m-Sulphanilic acid | 2-Amino-1-sulpho-5-aminomethyl-naphthalene | 1-Ethyl-3-sulpho-4-methyl-6-hydroxy-pyrid-2-one | yellow |
| 41 | m-Sulphanilic acid | 2-Amino-1-sulpho-5-aminomethyl-naphthalene | 1-Ethyl-4-methyl-6-hydroxy-pyrid-2-one | yellow |
| 42 | m-Sulphanilic acid | 2-Amino-1-sulpho-5-aminomethyl-naphthalene | 1-Ethyl-3-cyano-4-methyl-6-hydroxy-pyrid-2-one | yellow |

EXAMPLE 43

A solution of 18.5 g of cyanuric chloride in 50 ml of acetone is poured into a neutralised solution of 17.3 g of 1-aminobenzene-3-sulphonic acid in 100 ml of water and 100 g of ice, and during the condensation the pH value is kept at 6 to 7 by dropwise addition of 2 N sodium hydroxide solution. After condensation has taken place, 25.2 g of 2-amino-1-sulpho-5-aminomethyl-naphthalene are added, the mixture is warmed to 30°–35° C., and the pH value of the solution is kept at 7 to 8 by dropwise addition of 2 N sodium hydroxide solution. As soon as no further 2-amino-1-sulpho-5-aminomethyl-naphthalene is detectable in the mixture, 7 g of sodium nitrite are added and the batch is poured onto a mixture of 200 g of ice and 25 ml of concentrated hydrochloric acid. The batch is stirred in an ice bath for one hour, after which a slight excess of nitrous acid is destroyed by adding sulphamic acid. A solution of 24.7 g of 1-ethyl-3-sulphomethyl-4-methyl-6-hydroxypyrid-2-one in 160 ml of water is now poured into this diazo suspension. The pH value, which initially is 1.5, is raised to 3.5 by dropwise addition of sodium hydroxide solution, a clear yellow solution being obtained. The batch is stirred for a further hour at pH 3.5 in an ice bath, after which it is brought to pH 7 and the dyestuff is precipitated by adding potassium chloride. After drying the product at 80° C., and grinding, a readily watersoluble, yellow dyestuff powder is obtained. The dyestuff corresponds to the formula

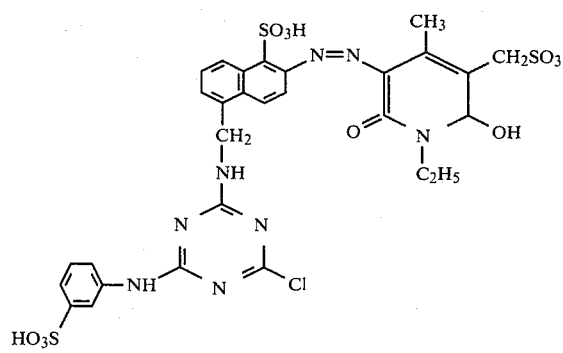

If the instructions of this example are followed, but instead of m-sulphanilic acid an equivalent amount of an amine component listed in column 2 is used and instead of 1-ethyl-3-sulphomethyl-4-methyl-6-hydroxy-pyrid-2-one an equivalent amount of the coupling component listed in column 3 is used, valuable dyestuffs are again obtained, which dye cotton, in accordance with one of the application processes mentioned, in one of the shade mentioned in column 4.

| Example | Amine component | Coupling component | Colour shade |
|---------|-----------------|-------------------|--------------|
| 44 | p-Sulphanilic acid | 1-Ethyl-3-carbamoyl-4-methyl-6-hydroxy-pyrid-2-one | greenish-tinged yellow |
| 45 | o-Sulphanilic acid | 1-Ethyl-3-carbamoyl-4-methyl-6-hydroxy-pyrid-2-one | greenish-tinged yellow |
| 46 | Anthranilic acid | 1-Ethyl-3-carbamoyl-4-methyl-6-hydroxy-pyrid-2-one | greenish-tinged yellow |
| 47 | As for Example 29 | 1-Ethyl-3-carbamoyl-4-methyl-6-hydroxy-pyrid-2-one | green |
| 48 | As for Example 30 | 1-Ethyl-3-carbamoyl-4-methyl-6-hydroxy-pyrid-2-one | green |
| 49 | As for Example 31 | 1-Ethyl-3-carbamoyl-4-methyl-6-hydroxy-pyrid-2-one | green |
| 50 | As for Example 32 | 1-Ethyl-3-carbamoyl-4-methyl-6-hydroxy-pyrid-2-one | green |
| 51 | As for Example 33 | 1-Ethyl-3-carbamoyl-4-methyl-6-hydroxy-pyrid-2-one | green |
| 52 | As for Example 34 | 1-Ethyl-3-carbamoyl-4-methyl-6-hydroxy-pyrid-2-one | green |
| 53 | As for Example 35 | 1-Ethyl-3-carbamoyl-4-methyl-6-hydroxy-pyrid-2-one | green |
| 54 | As for Example 36 | 1-Ethyl-3-carbamoyl-4-methyl-6-hydroxy-pyrid-2-one | green |
| 55 | As for Example 37 | 1-Ethyl-3-carbamoyl-4-methyl-6-hydroxy-pyrid-2-one | green |

EXAMPLE 56

25.2 g of 2-amino-1-sulpho-5-aminomethyl-naphthalene are stirred with a mixture of 150 g of ice and 150 ml of water. 16.9 g of 2,4,6-trifluoro-5-chloropyrimidine are then added dropwise and a pH of 7 to 8 is maintained at 0° C. by simultaneous addition of 2 N sodium hydroxide solution. After completion of the condensation, the mixture is warmed to room temperature and 7 g of sodium nitrite are added. The solution is then added dropwise to a mixture of 100 ml of water, 200 g of ice and 28 ml of concentrated hydrochloric acid. Stirring is continued for half an hour, the excess nitrite is removed with amidosulphonic acid, and the slurry from the diazotisation is added to a solution of 24.7 g of 1-ethyl-3-sulphomethyl-4-methyl-6-hydroxy-pyrid-2-one and 28 g of sodium bicarbonate in 200 ml of water. The mixture is stirred for a further hour, and the dyestuff is precipitated with potassium chloride. After drying the product at 50° C., and grinding, a yellow dyestuff powder is obtained, which readily dissolves in water to give a lemon-yellow colour. The dyestuff corresponds to the formula

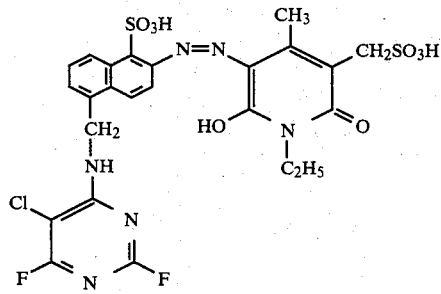

If the instructions of this example are followed, but instead of 2,4,6-trifluoro-5-chloro-pyrimidine an equivalent amount of the reactive components listed in column 2 is used and instead of 1-ethyl-3-sulphomethyl-4-methyl-6-hydroxy-pyrid-2-one an equivalent amount of the coupling components listed in column 3 is used, valuable reactive dyestuffs are again obtained, which dye in cotton, in accordance with one of the processes listed, in one of the shades mentioned in column 4.

EXAMPLE 64

45.9 g of 1-sulpho-5-aminomethyl-naphthalene<2 azo 5>-1-ethyl-3-carbamoyl-4-methyl-6-hydroxy-pyrid-2-one are suspended in 500 ml of water and 14 g of benzoyl chloride are added dropwise at room temperature, whilst maintaining a pH of 8 to 8.5 by simultaneous addition of dilute sodium hydroxide solution. After completion of the acylation, the dyestuff is isolated, dried and ground. It is a yellow water-soluble powder and corresponds to the formula

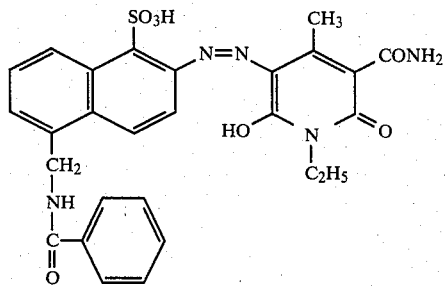

If benzoyl chloride is replaced by an equivalent amount of the acylating agents listed below, and the instructions of the present example are followed, valuable dyestuffs are again obtained: acetic anhydride, propionic acid chloride, cyclohexenecarboxylic acid chloride, phenyl chloroformate, ethyl chloroformate, p-chlorobenzoyl chloride, benzenesulphonic acid chloride and p-toluenesulphonic acid chloride.

EXAMPLE 65

A solution of 18.5 g of cyanuric chloride in 50 ml of acetone is added to a solution of 47.3 g of the secondary condensation product of 1 mol of cyanuric chloride, 1 mol of 1,3-diamino-benzene-4-sulphonic acid and 1 mol of 1-aminobenzene-3-sulphonic acid in 500 g of ice water. During the condensation, a pH of 6–7 is maintained by adding 2 N NaOH. When no further amino groups are detectable, 45.4 g of the azo dyestuff 1-sulpho-5-aminomethyl-naphthalene<2 azo 5>-1-ethyl-3-carbamoyl-4-methyl-6-hydroxy-pyrid-2-one are added and the mixture is warmed to 30°–35° C., whilst keeping the pH at 8.5 with 2 N NaOH. After completion of the condensation, the dyestuff is salted out, filtered off, dried and ground. It is a yellow, readily water-soluble powder and corresponds to the formula

| Example | Reactive component | Coupling component | Colour shade |
|---|---|---|---|
| 57 | 2-Amino-4,6-dichloro-triazine | 1-Ethyl-3-sulpho-4-methyl-6-hydroxy-pyrid-2-one | greenish-tinged yellow |
| 58 | 2-Methoxy-4,6-dichloro-triazine | 1-Ethyl-3-sulpho-4-methyl-6-hydroxy-pyrid-2-one | greenish-tinged yellow |
| 59 | 2-Methoxy-4,6-dichloro-triazine | 1-Ethyl-3-carbamoyl-4-sulphomethyl-6-hydroxy-pyrid-2-one | greenish-tinged yellow |
| 60 | 2,4,6-Trifluoro-5-chloro-pyrimidine | 1-Ethyl-3-carbamoyl-4-sulphomethyl-6-hydroxy-pyrid-2-one | greenish-tinged yellow |
| 61 | 2,3-Dichloroquinoxaline-6-carboxylic acid chloride | 1-Ethyl-3-sulphomethyl-4-methyl-6-hydroxy-pyrid-2-one | greenish-tinged yellow |
| 62 | 2,3-Dichloroquinoxaline-6-carboxylic acid chloride | 1-Ethyl-3-sulpho-4-methyl-6-hydroxy-pyrid-2-one | greenish-tinged yellow |
| 63 | Tetrachloropyrimidine | 1-Ethyl-3-sulpho-4-methyl-6-hydroxy-pyrid-2-one | greenish-tinged yellow |

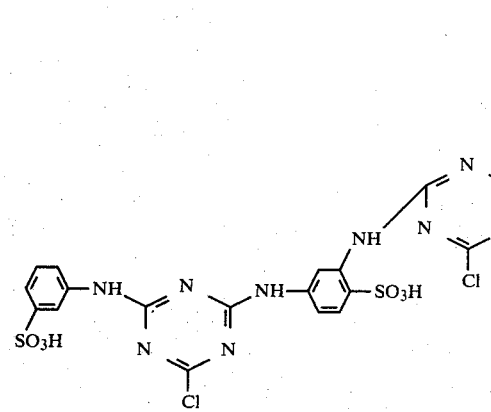

If the instructions of this example are followed, but instead of the secondary condensation product of 1 mol of cyanuric chloride, 1 mol of 1,3-diamino-benzene-4-sulphonic acid and 1 mol of 1-amino-benzene-3-sulphonic acid the products listed below are employed, valuable dyestuffs are again obtained, which when applied in textile printing are distinguished by a particularly high fixing efficiency.

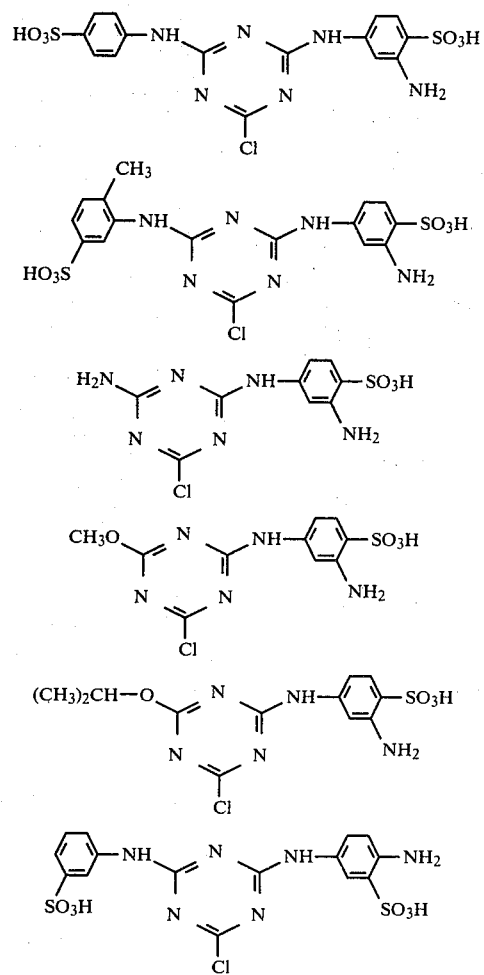

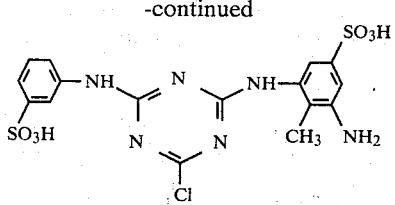

USE EXAMPLES

Dyeing instruction 168 ml of water at 20°-25° C. are first introduced into a dyeing beaker of 300 ml capacity, located in a heatable water bath. 0.3 g of the dyestuff obtained according to Example 1 is thoroughly worked into a paste with 2 ml of cold water and 30 ml of hot water (70° C.) are added; hereupon, the dyestuff dissolves. The dyestuff solution is added to the water already introduced into the beaker and 10 g of cotton yarn are constantly agitated in this dyeing liquor. In the course of 10 minutes, the temperature of the dyeing liquor was raised to 40° C.-50° C., 10 g of anhydrous sodium sulphate are added and dyeing is continued for 30 minutes. 4 g of anhydrous sodium carbonate are then added to the dyeing liquor and dyeing is carried out for 60 minutes at 40°-50° C. Thereafter, the dyed material is taken out of the dyeing liquor, the adhering liquor is removed by wringing out or pressing out, and the material is rinsed first with cold water and then with hot water until the rinsing liquor is no longer stained. Thereafter, the dyed material is soaped for 20 minutes at the boil in 200 ml of a liquor which contains 0.2 g of sodium alkyl-sulphate, again rinsed and dried in a drying cabinet at 60°-70° C. A brilliant greenish-tinged yellow having outstanding washfastness and lightfastness is obtained.

Padding instruction 30 parts of the dyestuff prepared according to Example 1 are dissolved in 1,000 parts of water. A cotton fabric is padded with this solution and pressed out to a weight pick-up of 90%. The still moist cotton is treated at 70° C., for 30 minutes, in a bath which contains 200 parts of calcined sodium sulphate and 10 parts of calcined sodium carbonate in 1,000 parts of water. The dyeing is then finished in the usual manner. A brilliant greenish-tinged yellow having excellent wetfastness and lightfastness is obtained.

Printing instruction

If cotton nettle is printed with a printing paste which contains, per kilogram, 20 g of the dyestuff prepared according to Example 1, 100 g of urea, 300 ml of water, 500 g of alginate thickener (60 g of sodium alginate/kg of thickener) and 10 g of sodium carbonate, and which has been made up to 1 kg with water, and if the printed fabric is dried, steamed for 1 minute at 103° C., rinsed with hot water and soaped at the boil, a clear strongly greenish-tinged yellow print of good wetfastness and lightfastness is obtained.

2 parts of the dyestuff obtained according to Example 43 are mixed with 20 g of urea and the mixture is dissolved in 28 ml of water and stirred into 40 g of a 5% strength sodium alginate thickener. 10 ml of a 10% strength sodium carbonate solution are then also added.

Using this printing ink, a cotton fabric is printed on a roller printing machine and dried, and the print obtained is steamed for 8 minutes at 105° C. Thereafter, the printed fabric is thoroughly rinsed in cold and hot water, and dried.

Dyeing instruction 0.1 g of the dyestuff obtained according to Example 64 is dissolved in 100 g of hot water. 5 ml of ammonium acetate solution are added and the mixture is diluted to 500 g with cold water. 10 g of polyamide textile material are introduced into this dye bath which is heated to the boil in the course of 20 minutes, 4 g of 10% strength acetic acid are added and the bath is kept at the boil for 1 hour. Thereafter, the dyed polyamide material is taken out of the dye bath, rinsed with hot water and dried at 70°–80° C. A polyamide fabric dyed greenish-tinged yellow is obtained.

EXAMPLE 66

25.3 g of aniline-2,5-disulphonic acid (amine component) are dissolved in 0.8 liter of ice water. 13.5 g of 2,4,6-trifluoro-1,3,5-triazine are then added dropwise, and at the same time dilute sodium hydroxide solution is added in order to maintain a pH of 2.5–3. After addition of the cyanuric fluoride, stirring is continued for a few minutes, and then a solution of 45.9 g of 1-sulpho-5-aminomethyl-naphthalene<2 azo 5>-1-ethyl-3-carbamoyl-4-methyl-6-hydroxy-pyrid-2-one in 1 liter of water and 14 ml of concentrated sodium hydroxide solution (d=1.5) is added dropwise at 0°–5°, without exceeding a pH of 8.5. The mixture is stirred at 8–8.5 until no further change in the pH takes place. The dyestuff is separated out from the clear solution by means of 25% by volume of sodium chloride. After filtering off the product, drying and grinding, a powder which is readily soluble in water, to give a yellow colour, is obtained. The dyestuff corresponds to the formula

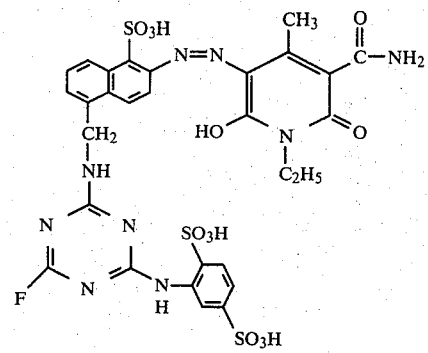

The dyestuff employed for the acylation is prepared by diazotising 2-amino-1-sulpho-5-aminomethyl-naphthalene and coupling to 1-ethyl-3-carbamoyl-4-methyl-6-hydroxy-pyrid-2-one in a neutral to weakly acid medium.

If the instructions of this example are followed, but using the amine components and coupling components listed in the table below, valuable dyestuffs are again obtained.

| Example | Amine component | Coupling component | Colour shade |
|---|---|---|---|
| 67 | Aniline-2,5-disulphonic acid | 1-Methyl-3-N-methyl-carboxamido-4,6-dihydroxy-pyrid-2-one | yellow |
| 68 | Aniline-2,4-disulphonic acid | 1-Methyl-3-N-methyl-carboxamido-4,6-dihydroxy-pyrid-2-one | yellow |
| 69 | m-Sulphanilic acid | 1-Methyl-3-N-methyl-carboxamido-4,6-dihydroxy-pyrid-2-one | yellow |
| 70 | o-Sulphanilic acid | 1-Methyl-3-N-methyl-carboxamido-4,6-dihydroxy-pyrid-2-one | yellow |
| 71 | p-Sulphanilic acid | 1-Methyl-3-N-methyl-carboxamido-4,6-dihydroxy-pyrid-2-one | yellow |
| 72 | Aniline-3,5-disulphonic acid | 1-Methyl-3-N-methyl-carboxamido-4,6-dihydroxy-pyrid-2-one | yellow |
| 73 | 1-Amino-2-methyl-4- or 5-sulphonic acid | 1-Methyl-3-N-methyl-carboxamido-4,6-dihydroxy-pyrid-2-one | yellow |
| 74 | 1-Amino-2,4-disulpho-6-methyl-benzene | 1-Methyl-3-N-methyl-carboxamido-4,6-dihydroxy-pyrid-2-one | yellow |
| 75 | 2-Amino-4,6,8-tri-sulpho-naphthalene | 1-Methyl-3-N-methyl-carboxamido-4,6-dihydroxy-pyrid-2-one | yellow |

EXAMPLE 76

A solution of 18.5 g of cyanuric chloride in 50 ml of acetone is poured into a neutralised solution of 25.3 g of aniline-2,5-disulphonic acid in 100 ml of water and 100 g of ice, and during the condensation the pH value is kept at 6 to 7 by dropwise addition of 2 N sodium hydroxide solution. After condensation has taken place, 25.2 g of 2-amino-1-sulpho-5-aminomethyl-naphthalene are added, the mixture is warmed to 30°–35° C. and the pH value of the solution is kept at 7–8 by dropwise addition of 2 N sodium hydroxide solution. When no further 2-amino-1-sulpho-5-aminomethyl-naphthalene is detectable in the mixture, 7 g of sodium nitrite are added and the batch is poured onto a mixture of 200 g of ice and 25 ml of concentrated hydrochloric acid. The whole is stirred for one hour in an ice bath, after which a slight excess of nitrous acid is destroyed by adding sulphamic acid. A solution of 24.7 g of 1-ethyl-3-sulphomethyl-4-methyl-6-hydroxypyrid-2-one in 160 ml of water is now poured into this diazo suspension. The pH value, which initially is 1.5, is raised to 3.5 by dropwise addition of sodium hydroxide solution, a clear yellow solution being obtained. The batch is stirred for a further hour at pH 3.5 in an ice bath, after which it is brought to pH 7 and the dyestuff is precipitated by adding potassium chloride. After drying at 80° C., and grinding, a readily water-soluble, yellow dyestuff powder is obtained. The dyestuff corresponds to the formula

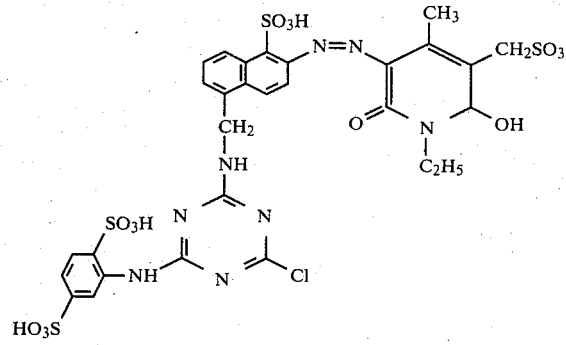

If the instructions of this example are followed, but instead of m-sulphanilic acid an equivalent amount of an amine component listed in column 2 is used and instead of 1-ethyl-3-sulphomethyl-4-methyl-6-hydroxy-pyrid-2-one an equivalent amount of the coupling components listed in column 3 is used, valuable dyestuffs are again obtained, which dye cotton, in accordance with one of the application processes listed, in one of the shade mentioned in column 4.

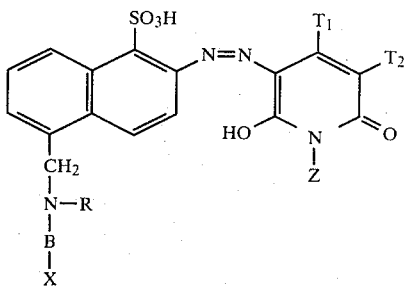

wherein
R ... hydrogen or lower alkyl,
$T_1$ ... hydrogen, optionally substituted alkyl, aralkyl, cycloalkyl, aryl, heteroaryl, or a group of the formula —CN, —COOR$_1$, —CONR$_1$R$_2$, —COR$_1$ or —OH, wherein
$R_1$ and $R_2$ each independently of one another denote hydrogen, optionally substituted alkyl, aralkyl, cycloalkyl, aryl or heteroaryl, or the group —NR$_1$R$_2$ represents the radical of a five-membered or six-membered heterocyclic ring compound,
$T_2$ ... hydrogen, optionally substituted alkyl, aralkyl, cycloalkyl, aryl, heteroaryl, a sulpho, a nitro, a nitroso, an alkylsulphonyl, an arylsulphonyl or an acylamino group, a halogen atom, such as chlorine, bromine or fluorine, or a group of the formula —CN, —COOR$_1$, —CONR$_1$R$_2$ or —COR$_1$,
Z ... hydrogen, optionally substituted alkyl, aralkyl, cycloalkyl, aryl or heteroaryl,
B ... a direct bond or divalent bridge member and
X ... an acyl radical.

| Example | Amine component | Coupling component | Colour shade |
|---|---|---|---|
| 77 | Aniline-2,5-disulphonic acid | 1-Ethyl-3-carbamoyl-4-methyl-6-hydroxypyrid-2-one | yellow |
| 78 | Aniline-2,5-disulphonic acid | 1-Ethyl-3-chloro-4-methyl-6-hydroxy-pyrid-2-one | yellow |
| 79 | Aniline-2,5-disulphonic acid | 1-Ethyl-3-nitro-4-methyl-6-hydroxy-pyrid-2-one | yellow |
| 80 | Aniline-2,5-disulphonic acid | 1-Ethyl-4-methyl-6-hydroxy-pyrid-2-one | yellow |
| 81 | Aniline-2,5-disulphonic acid | 1-Ethyl-3-N-methylcarboxamido-4-methyl-6-hydroxy-pyrid-2-one | yellow |
| 82 | Aniline-2,5-disulphonic acid | 1-Methyl-3-N-methylcarboxamido-4,6-dihydroxy-pyrid-2-one | yellow |
| 83 | Aniline-2,4-disulphonic acid | 1-Methyl-3-N-methylcarboxamido-4,6-dihydroxy-pyrid-2-one | yellow |
| 84 | Aniline-3,5-disulphonic acid | 1-Methyl-3-N-methylcarboxamido-4,6-dihydroxy-pyrid-2-one | yellow |
| 85 | 1-Amino-2,5-disulpho-4-methoxy-benzene | 1-Methyl-3-N-methylcarboxamido-4,6-dihydroxy-pyrid-2-one | yellow |
| 86 | 2-Amino-4,6,8-triphulso-naphthalene | 1-Methyl-3-N-methylcarboxamido-4,6-dihydroxy-pyrid-2-one | yellow |

I claim:
1. Dyestuffs of the formula

2. Dyestuffs of the formula

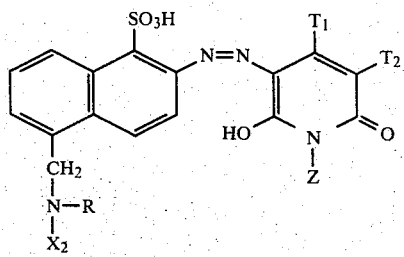

wherein

R, $T_1$, $T_2$ and Z have the meaning given in claim 1 and $X_2$ denotes the radical of a reactive component.

3. Dyestuffs of claims 1 or 2, wherein

X or $X_2$ = dichlorotriazinyl, monochlorotriazinyl, trihalogenopyrimidinyl, 2,3-dichloroquinoxaline-6-carbonyl or 6-sulphonyl or dihalogenopyrimidinyl.

4. Dyestuffs of the formula

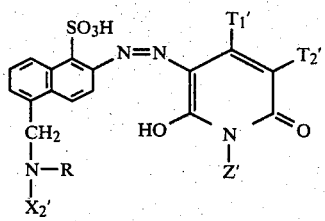

wherein

R and $T_1'$ = lower alkyl, $T_2'$ =

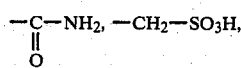

halogen, nitro, sulpho, cyano or H, $Z'$ = lower alkyl and $X_2'$ = dichlorotriazinyl, monochlorotriazinyl, trihalogenopyrimidinyl, dihalogenopyrimidinyl or 2,3-dichloroquinoxaline-6-carbonyl.

5. Dyestuffs of the formula

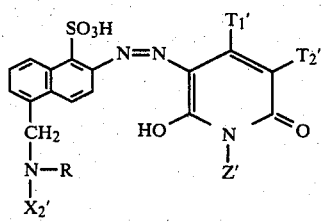

wherein

R and $T_1'$ = lower alkyl, $T_2'$ =

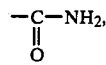

halogen, nitro, sulpho, cyano or H, $Z'$ = lower alkyl and $X_2'$ = monofluorotriazinyl.

6. Dyestuffs of the formula

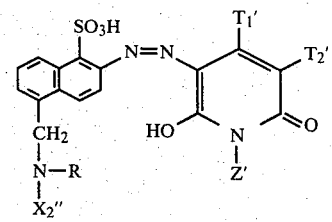

wherein

R and $T_1'$ = lower alkyl, $T_2'$ =

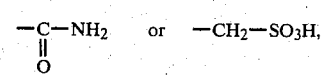

$Z'$ = lower alkyl and $X_2''$ = o- or p-sulphophenylamino-fluorotriazinyl.

7. Dyestuffs of the formula

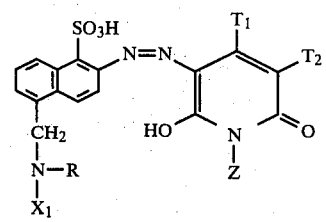

wherein $T_1'$ $T_2$ and Z have the meaning given in claim 1 and $X_1$ represents a non-reactive acyl radical.

8. Process for the preparation of the dyestuffs of claim 1, characterised in that amines of the formula

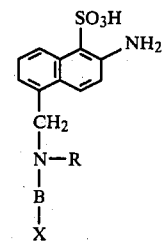

wherein

B, R and X have the meaning given in claim 1 are diazotised and the product is coupled with pyridones of the formula

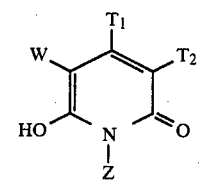

wherein $T_1$, $T_2$ and Z have the meaning given in claim 1) and W represents a radical which is detachable during the coupling reaction, or represents a hydrogen atom.

9. Process for the preparation of the dyestuffs of claim 1, characterised in that dyestuffs of the formula

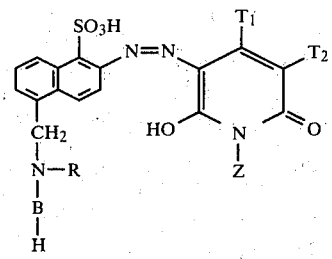

wherein
B, R, $T_1$, $T_2$ and Z have the meaning given in claim 1, are reacted with an acyl component of the formula Y—X, wherein
X has the meaning given in claim 1 and
Y represents a detachable group, with elimination of HY.

10. Use of the dyestuffs of claim 1 for dyeing and printing fibre materials containing hydroxyl groups or containing amide groups.

* * * * *